US012657035B2

(12) United States Patent
Jayaraj et al.

(10) Patent No.: US 12,657,035 B2
(45) Date of Patent: Jun. 16, 2026

(54) ACCELERATOR CAPABLE OF EXECUTING FAST DYNAMIC CHANGE IN ACCELERATION TYPE

(71) Applicant: Intel Corporation, Santa Clara, CA (US)

(72) Inventors: Navneeth Jayaraj, Sarjapura (IN); Richard Marian Thomaiyar, Trichy (IN); Ashraf Javeed, Bangalore (IN); Vikas Mishra, Bangalore (IN); Rajesh Poornachandran, Portland, OR (US); Mahammad Yaseen Isasaheb Mulla, Bangalore (IN); Laxminarayan Kamath, Bangalore (IN); Karunakara Kotary, Portland, OR (US); Dustin Fredrickson, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/847,166

(22) Filed: Jun. 22, 2022

(65) Prior Publication Data

US 2022/0326962 A1     Oct. 13, 2022

(51) Int. Cl.
*G06F 9/44* (2018.01)
*G06F 1/28* (2006.01)
*G06F 9/4401* (2018.01)

(52) U.S. Cl.
CPC ............. *G06F 9/4411* (2013.01); *G06F 1/28* (2013.01)

(58) Field of Classification Search
CPC .................................. G06F 9/4411; G06F 1/28
See application file for complete search history.

(56) References Cited

U.S. PATENT DOCUMENTS

| | | | |
|---|---|---|---|
| 12,160,369 B2 * | 12/2024 | Chang | H04L 47/6215 |
| 2008/0028186 A1 * | 1/2008 | Casselman | G06F 15/7867 |
| | | | 712/E9.002 |
| 2014/0075171 A1 * | 3/2014 | Karimian-Kakolaki | |
| | | | G06F 1/26 |
| | | | 713/300 |
| 2018/0302077 A1 | 10/2018 | Navarro et al. | |
| 2020/0075061 A1 | 3/2020 | Rowley | |
| 2021/0157383 A1 * | 5/2021 | Hsu | G06F 1/3287 |
| 2022/0012396 A1 | 1/2022 | Jayaraj et al. | |
| 2022/0113773 A1 * | 4/2022 | Ma | H05K 7/20809 |
| 2023/0030396 A1 * | 2/2023 | Kaburlasos | G06F 1/3206 |
| 2023/0126109 A1 * | 4/2023 | Mukherjee | G06F 1/3234 |
| | | | 713/320 |
| 2025/0085770 A1 * | 3/2025 | Louie | G06F 1/329 |

OTHER PUBLICATIONS

Intel Corporation, "Intel® Infrastructure Processing Unit (Intel® IPU) and SmartNICs", https://www.intel.com/content/www/us/en/products/network-io/smartnic.html, Jun. 14, 2022, 7 pages.

* cited by examiner

*Primary Examiner* — Zahid Choudhury
(74) *Attorney, Agent, or Firm* — Compass IP Law PC

(57) ABSTRACT

An apparatus is described. The apparatus includes an accelerator having an interface to plug into an electronic system. The accelerator includes a field programmable gate array integrated circuit to perform acceleration, a general purpose processor integrated circuit to execute software related to the acceleration and controller circuitry to dynamically change, without rebooting the general purpose processor integrated circuit, allocation of the accelerator's power budget to the field programmable gate array integrated circuit and the general purpose processor integrated circuit.

25 Claims, 17 Drawing Sheets

| Accelerator Power Budget 211 | SPC Config 212 | GPP Power Allocation 213 | GPP Power Settings 214 |
|---|---|---|---|
| 1000 | NA = 800 | 200 | P_7 = max # cores = N; CLK_freq = 50 |
| | vLAN = 700 | 300 | P_8 = max # cores = N+1; CLK_freq = 60 |
| | OVA = 600 | 400 | P_9 = max # cores = N+2; CLK_freq = 70 |
| | MO = 500 | 500 | P_10 = max # cores = N+2; CLK_freq = 80 |
| 900 | NA = 800 | 100 | P_6 = max # cores = N; CLK_freq = 25 |
| | vLAN = 700 | 200 | P_7 = max # cores = N; CLK_freq = 50 |
| | OVA = 600 | 300 | P_8 = max # cores = N+1; CLK_freq = 60 |
| | MO = 500 | 400 | P_9 = max # cores = N+2; CLK_freq = 70 |

Telemetry Data

Mgt. Com. 311

Telemetry 312

SPC/GPP Pwr. Mgt. 313

301

Manager(s) 302

Accelerator power budget; SPC configuration

ACCELERATOR CAPABLE OF EXECUTING FAST DYNAMIC CHANGE IN ACCELERATION TYPE

BACKGROUND

With the onset of "big-data", cloud computing, and other computationally intense operating environments, system engineers are constantly seeking ways to increase performance while keeping power consumption within acceptable limits.

FIGURES

FIG. 1 shows an embodiment of an accelerator;

FIGS. 2a, 2b, 2c, 2d, 2e, 2f, 2g, 2h, 2i, 2j, and 2k depict processes that can be executed by the accelerator of FIG. 1;

DETAILED DESCRIPTION

Figure 1:
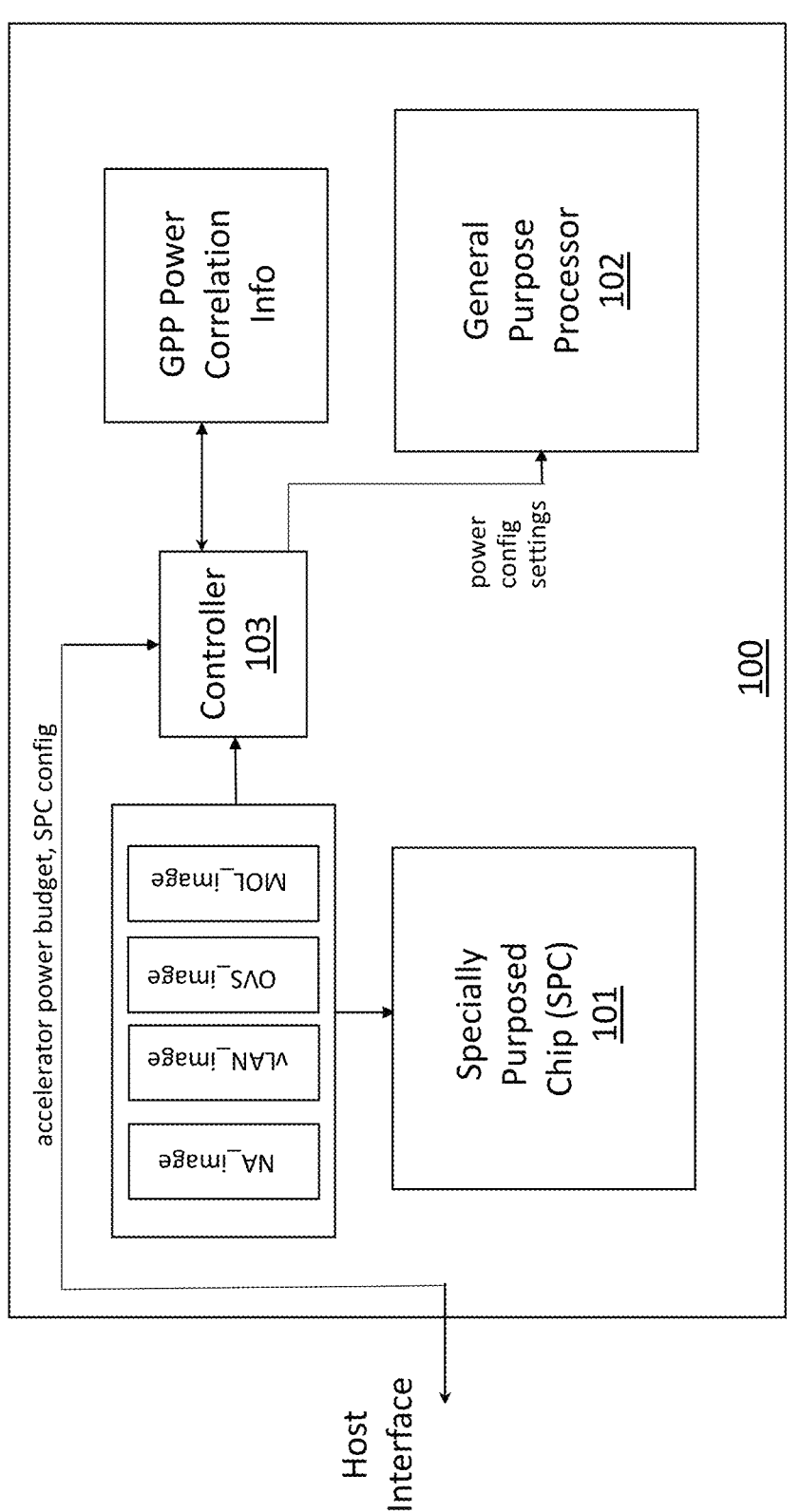

FIG. 1 depicts an accelerator 100 that is able to dynamically reconfigure a specially purposed chip 101 during runtime while the program code executing on a general purpose processor 102 continues to execute seamlessly (e.g., the general purpose processor 102 does not need to be rebooted and reloaded with a new instance of executable BIOS program code because of the configuration change made to the specially purposed chip 101).

An accelerator 100 is commonly used to speed-up computationally intensive tasks such as network acceleration (e.g., processing network payloads and/or header information to streamline network flows), virtual radio access network (vRAN) processing (e.g., wireless baseband processing (e.g., forward error correction encoding/decoding) in a virtualized software environment), open virtual switching (OVS) (e.g., Ethernet switching in a virtualized software environment), memory off-loading (e.g., determining which data items in memory are less frequently used and moving them to a lower tier (e.g., remote) memory), and infrastructure processing unit (IPU) acceleration (e.g., dispatching incoming software function calls to CPU processing resources that can service the calls), among other possibilities.

As observed in FIG. 1, the accelerator 100 includes both a specially purposed semiconductor chip (SPC) 101 (e.g., application specific integrated circuit (ASIC), field programmable gate array (FPGA), special purpose processor (e.g., graphics processor)), and a general purpose processor (GPP) semiconductor chip 102 (e.g., a multi GPP core multiprocessor).

The SPC 101 performs complex processing tasks associated with the acceleration (e.g., payload compression in the case of network acceleration, low density parity check (LDPC) encoding/decoding in the case of vRAN, nodal hop address switching in the case of OVS, etc.). By contrast, the GPP chip 102 performs more generalized functions associated with the acceleration (e.g., call switching in the case of vRAN, ingress/egress traffic queueing in the case of OVS, etc.). The accelerator 100 also includes a controller 103 for managing the overall power consumption of the accelerator including determining specific power allocations for both the SPC 101 and the GPP 102.

FIGS. 2a through 2k pertain to an exemplary scenario in which the accelerator 200 is first brought-up and then executes for some extended runtime before a change is made to the SPC's configuration.

Figure 2A:
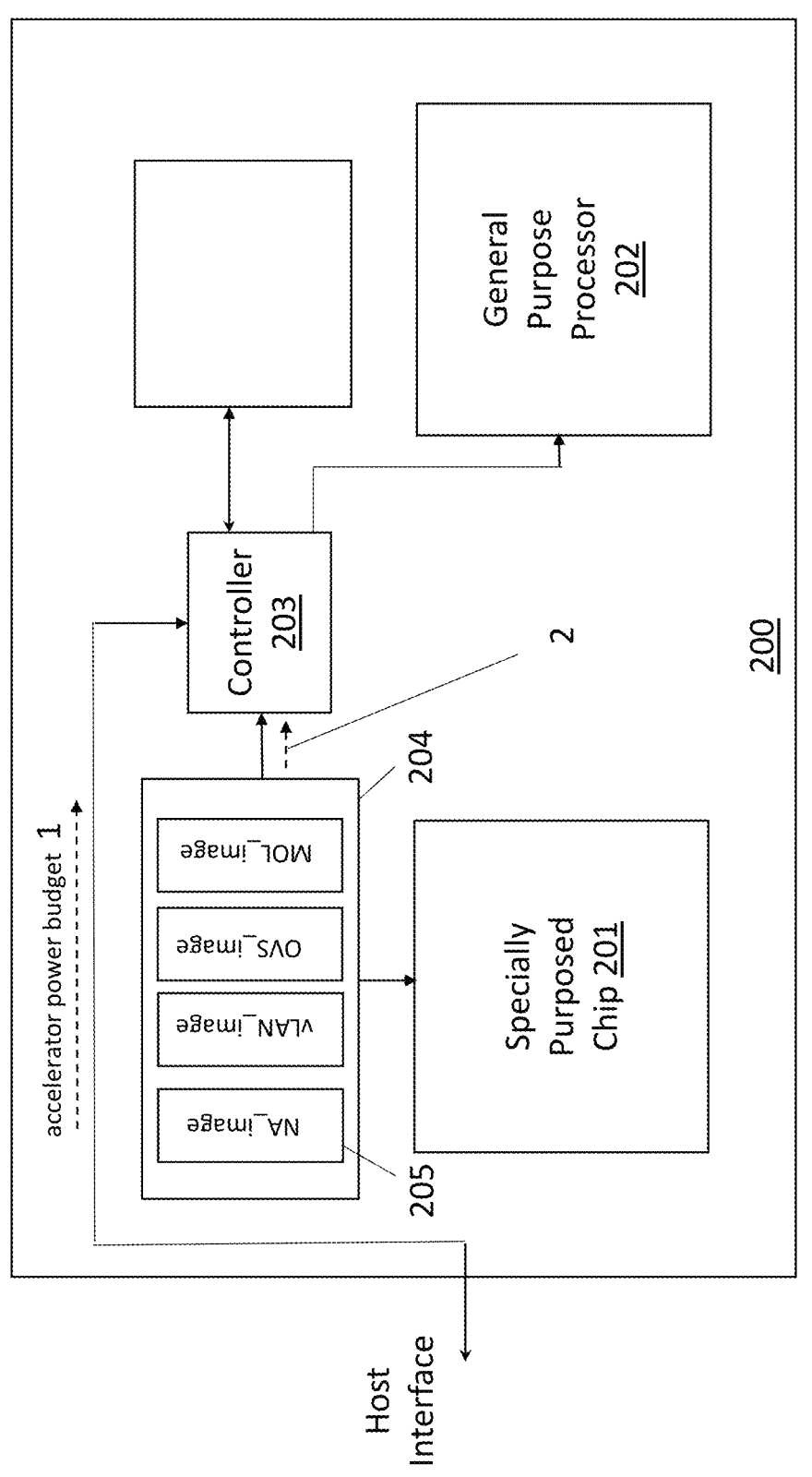

As observed in FIG. 2a, the accelerator 200 includes respective images 205 stored in first non-volatile memory space 204 for each of the SPC chip's different configurations. For example, a first image 205 exists for network acceleration (NA), a second image exists for vLAN, etc. (for ease of drawing only the NA image 205 is labeled). Each image corresponds to a collection of information that is pertinent to a particular configuration of the SPC 201.

For example, if the SPC 201 is an FPGA, the different images 205 stored in the first non-volatile memory space 204 include respective bitstreams that configure the FPGA's internal (e.g., SRAM) logic for a particular type of acceleration (e.g., network acceleration, vRAN, OVS, memory offloading, etc.). The different images 205 also include power profile information for the FPGA when configured to perform the particular type of acceleration.

For example, the NA image 205 contains an NA bitstream and power related characteristics of the FPGA when configured with the NA bitstream, the vLAN image contains a vLAN bitstream and power related characteristics of the FPGA when configured with the vLAN bitstream, etc. Notably, the FPGA's power related characteristics can vary across its different configurations.

During initial boot-up, referring to FIG. 2a, the controller 203 is informed of the accelerator's power budget 1 by the larger environment within which the accelerator 200 operates (e.g., a server and/or data center). The controller 203 also reads 2 (e.g., all of) the images 1 from the first non-volatile memory region 204 and processes them to build a correlation between accelerator power budget, SPC configuration, and GPP power settings. FIG. 2b shows an example of such a correlation.

Figure 2C:
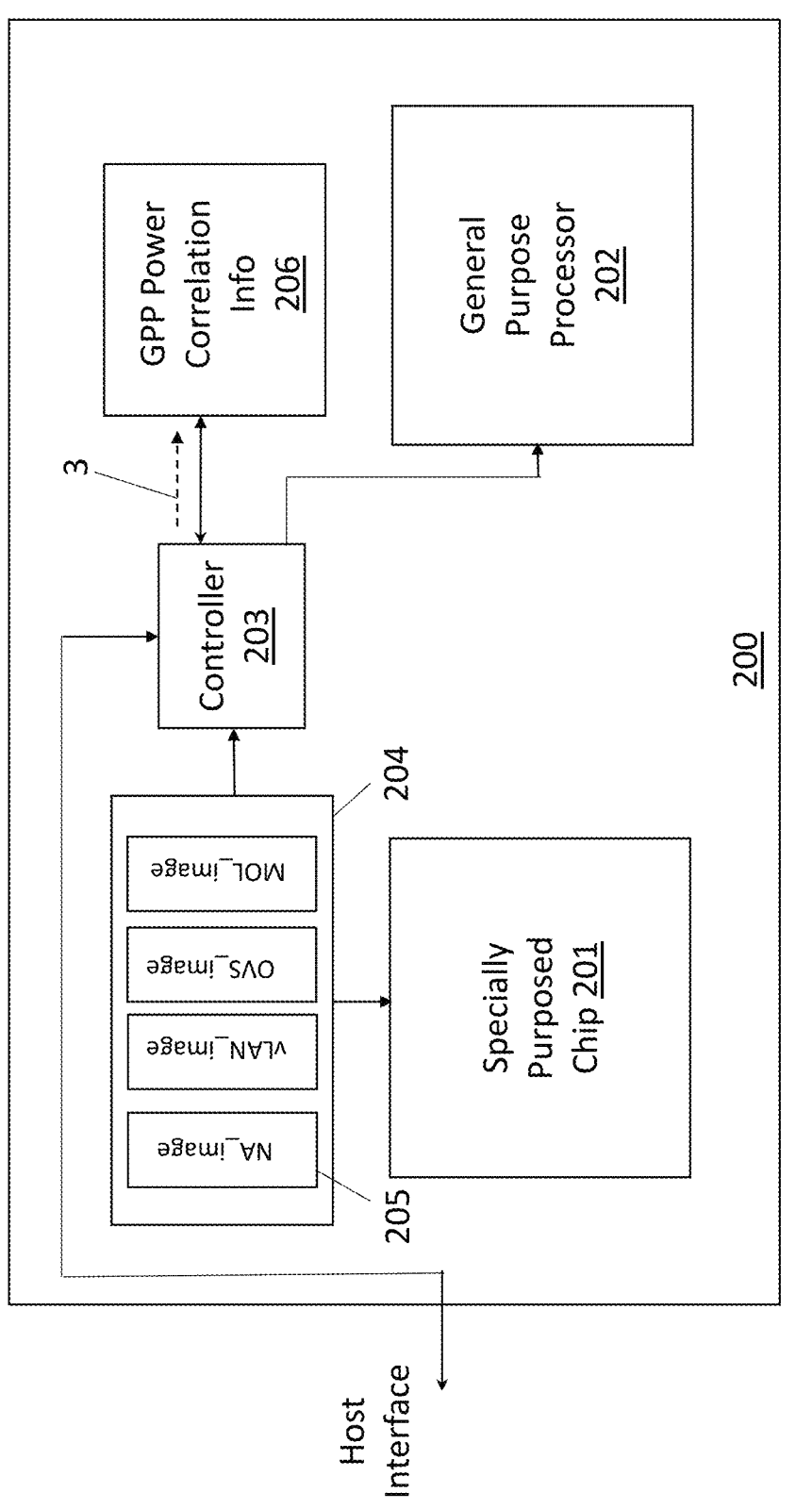

As observed in FIG. 2c, the different SPC configurations and their respective power consumption characteristics (as taken from the images in the first non-volatile memory space 204) are listed for each of different, possible accelerator power budgets. This arrangement of information describes the different power configurations that the accelerator can be placed into.

That is, the different power budgets that can be assigned to the accelerator 200 are listed in column 211. For any one of the accelerator power budgets, the SPC 201 will be configured into one of its SPC configurations which are listed in column 212 (the various accelerator power budgets and various SPC power consumptions are listed in descending order). A third column 213 shows the remaining power when the power consumed by the SPC 201 in a particular configuration listed in the second column 212 is subtracted from the accelerator power budget 211 listed in the first column.

In various embodiments, the remaining power 213 (or substantial portion thereof) is allocated to the GPP 202. Thus, a fourth column 214 identifies a set of power settings (e.g., maximum number of allowed active GPP cores, maximum GPP clock frequency, etc.) that can be applied to the GPP 202 to keep its power consumption within its power allocation.

Notably, there can be overlap between the different GPP power settings 214 and the different combinations of accelerator power budget 211 and SPC configuration 212 (power configuration settings P_7, P_8, and P_9 appear in both of the accelerator budgets observed FIG. 2c). As such, the different accelerator budgets 211 combined with the different possible SPC configurations 212 within each accelerator budget resolve to a finite set of GPP power allocations 213 and corresponding GPP power settings 214.

Upon the controller 203 processing the power profile information of each SPC configuration image in the first non-volatile memory space 204 and building the correlation information discussed just above, referring to FIG. 2c, the accelerator controller 203 stores 3 the correlation knowledge in second non-volatile memory space 206. In an alternate embodiment, the correlation knowledge is coded into the accelerator controller's executing software (e.g., by assigning the tabular information to specific variables in the controller's program code). For ease of discussion the remainder of the discussion will assume the correlation knowledge is stored in the second non-volatile memory space 206.

Figure 2D:
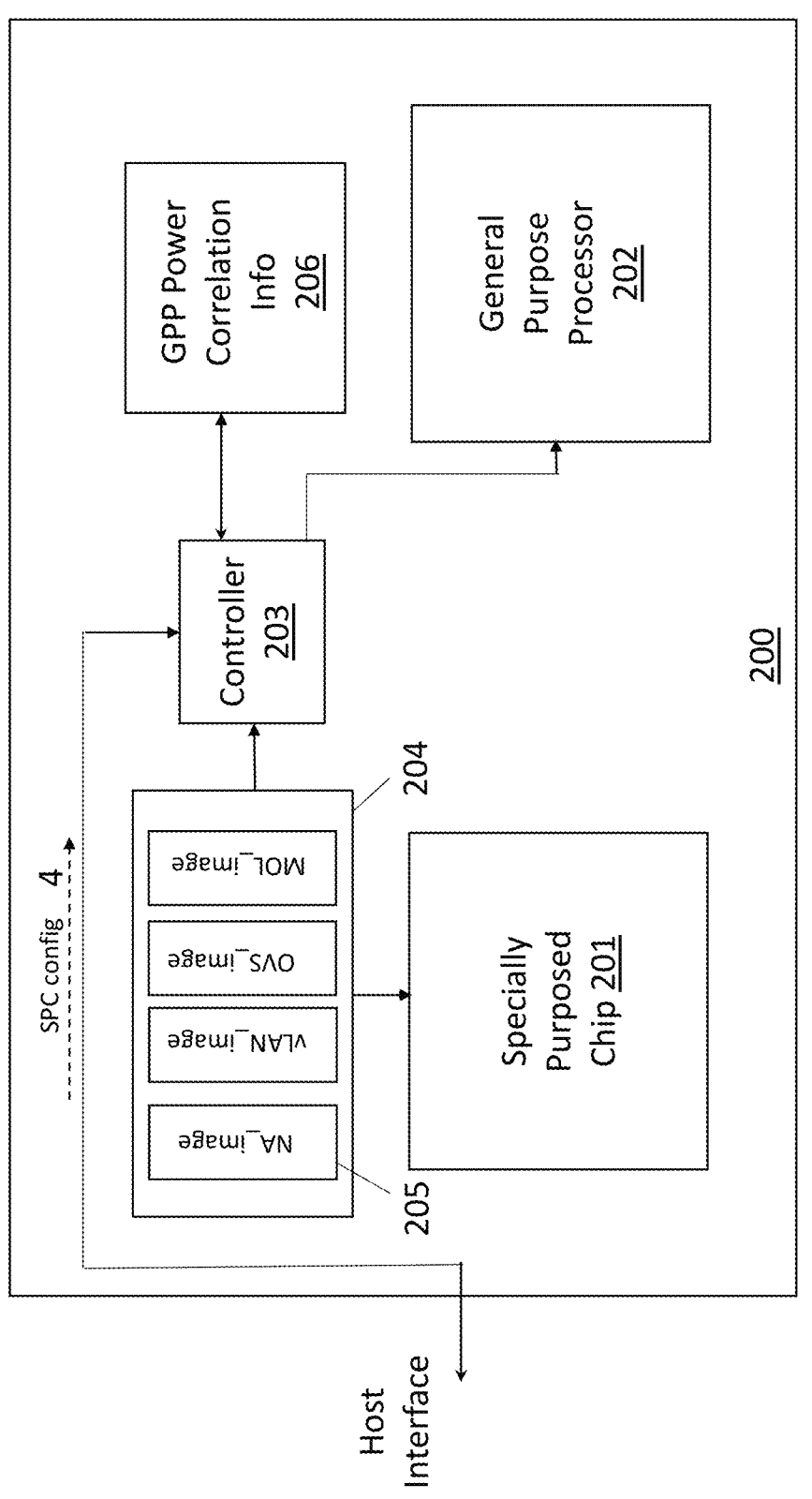

Continuing with the boot-up process, referring to FIG. 2d, the controller 203 next looks to understand the accelerator's boot-up configuration. In an embodiment, initial configuration of the SPC 201 is communicated 4 to the accelerator 200 from, e.g., some managerial entity of the accelerator's operating environment. Here, for example, a data center oversight function determines that the accelerator 200 being newly brought-up should perform a particular type of acceleration and then communicate 3 that acceleration to the accelerator 200. In other embodiments, the SPC's initial configuration can be stored in other non-volatile memory space of the accelerator.

Figure 2E:
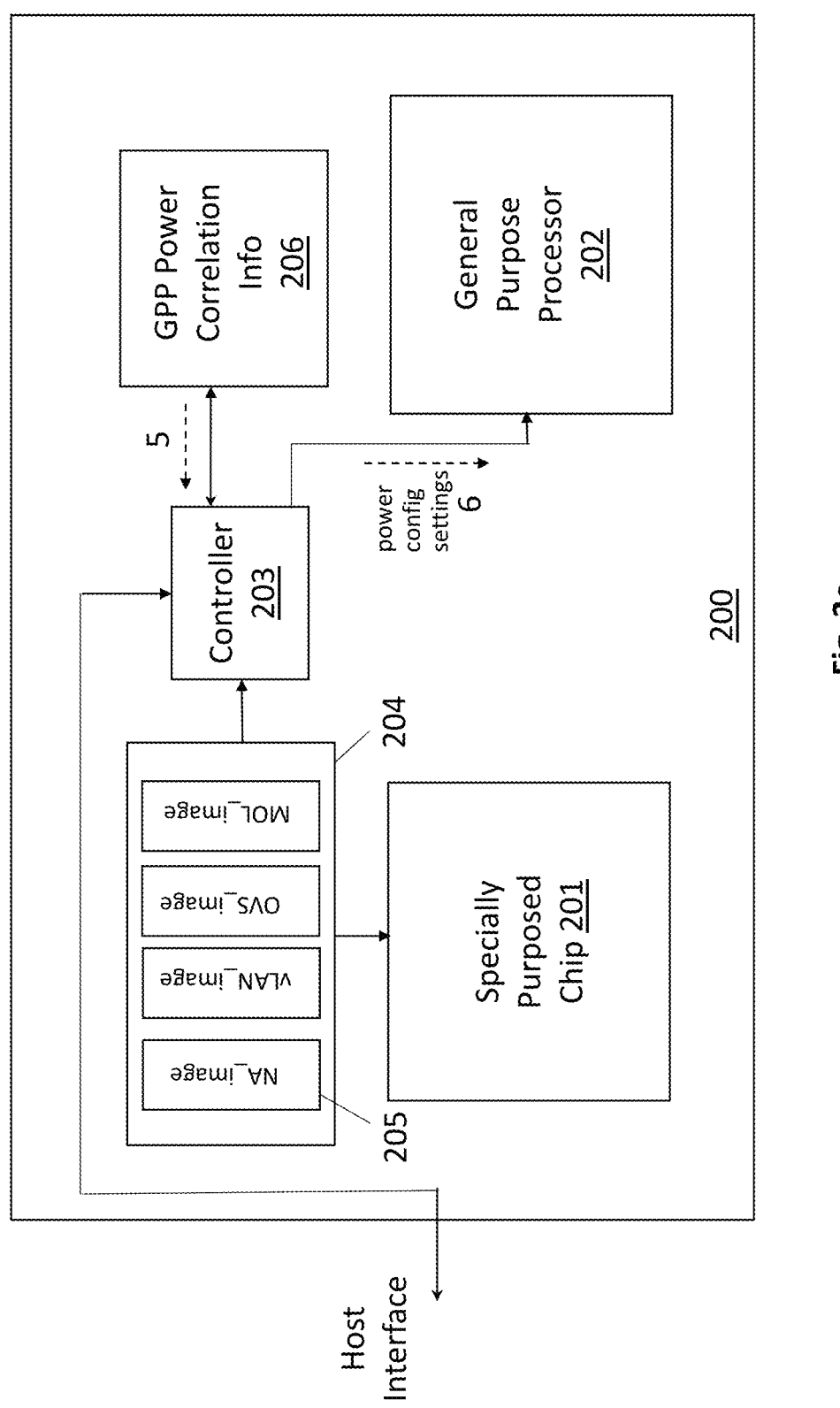

With the controller 203 having built the correlation information and understanding both the accelerator power budget and the SPC configuration, referring to FIG. 2e, the controller 203 accesses 5 the correlation information in the second non-volatile memory space 206 to look-up the appropriate GPP power settings and then applies 6 them to the GPP (e.g., the controller communicates 6 specific allowed/non-allowed processing cores states and maximum allowed clock frequencies to the GPP's power controller and/or otherwise causes power related configuration space of the GPP to be written to with information that causes the GPP to remain within its allocated power).

Figure 2F:
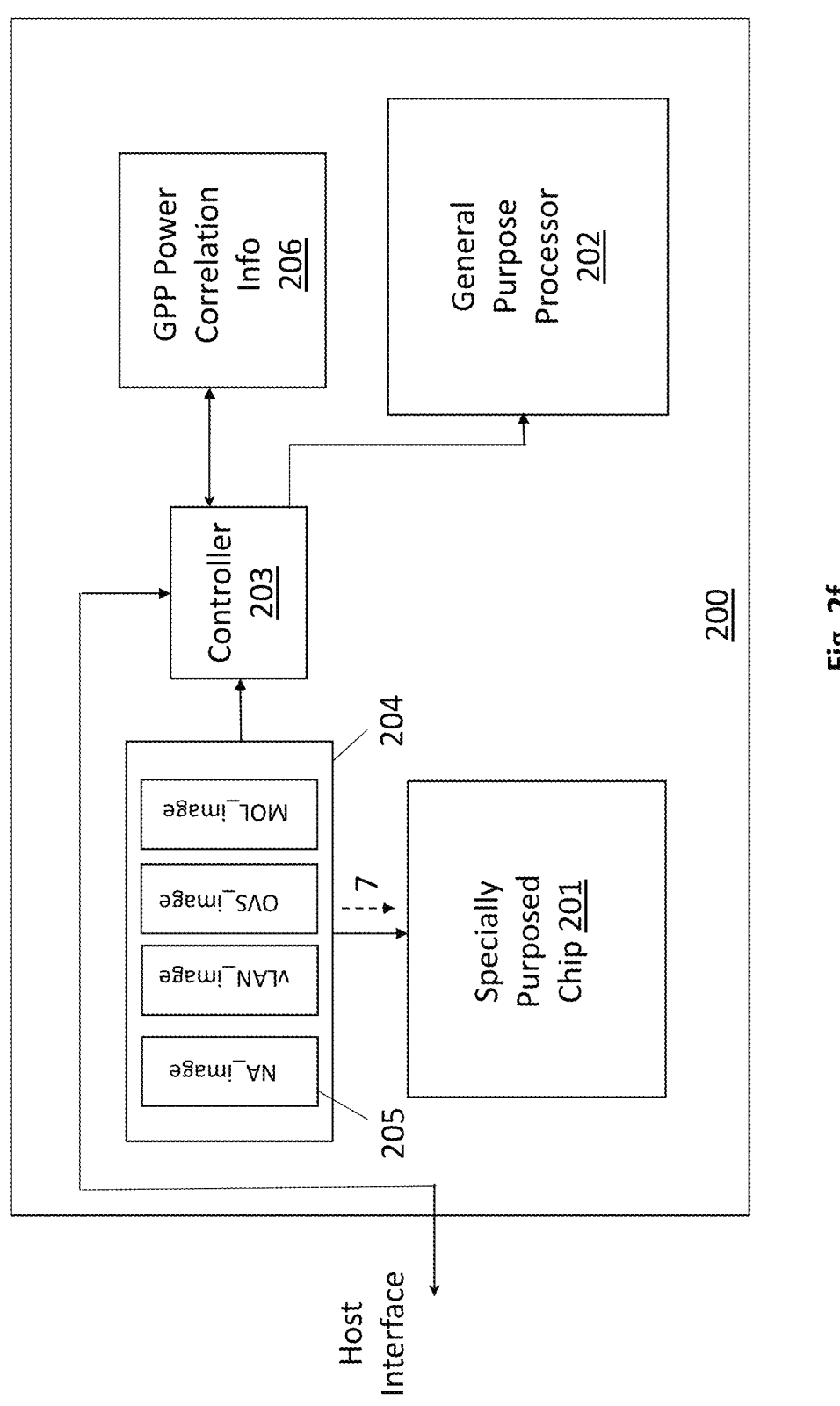

Referring to FIG. 2f, the controller also reads the image in the first non-volatile storage space that is specific to the SPC's boot-up configuration and applies it and/or causes it to be applied 7 to the SPC. For example, if the SPC is an FPGA, the controller 203 causes the bitstream in the image to be loaded into the FPGA to configure it's logic. Any other pertinent information in the image, such as the timing of certain control signals and/or input clock frequency requirements are also processed by the controller 203 and applied to the FPGA. Ignoring nominal other boot-up tasks, the boot-up is complete once the SPC 201 is operational.

Figure 2G:
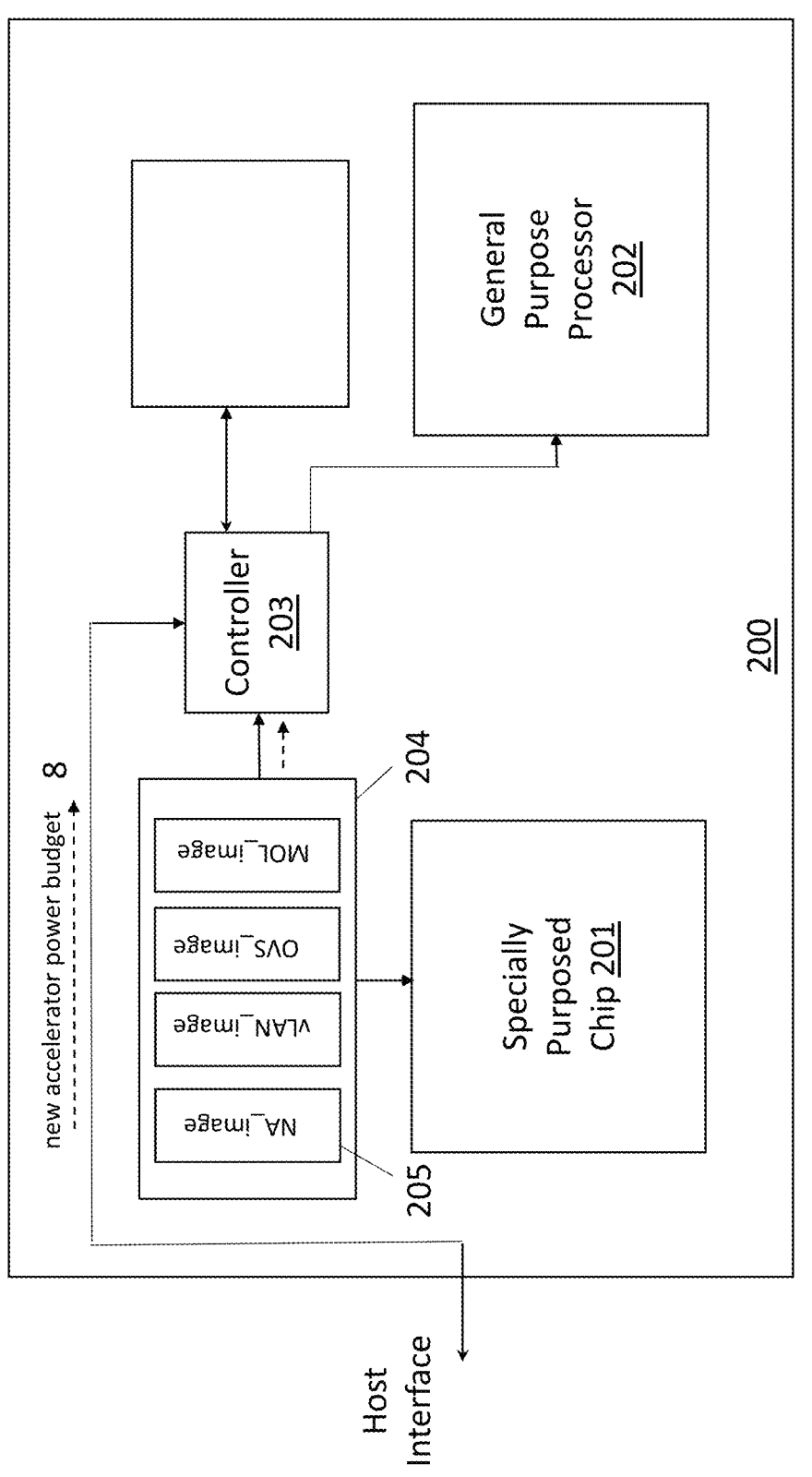

After the accelerator 200 has operated from its initial boot-up configuration for some extended runtime, referring to FIG. 2g, assume the accelerator power budget is changed. For example, a server computer that the accelerator 200 is plugged into (or a control function of a data center that the server is a component of) determines that it needs to allocate power away from the accelerator for other uses and communicates 8 a lower acceleration to the accelerator.

Figure 2H:
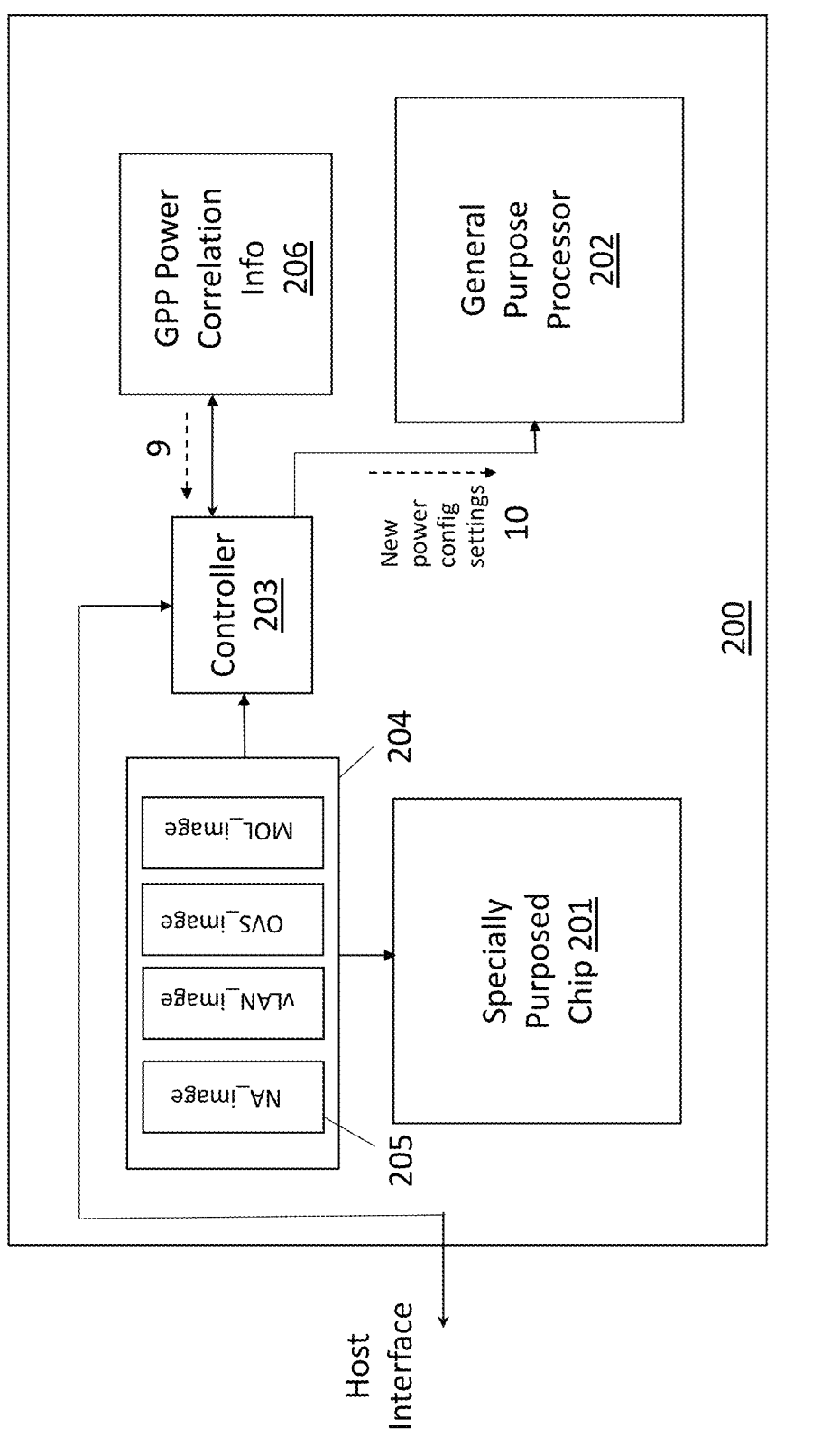

In response, referring to FIG. 2h, the controller 203 accesses 9 the correlation information in the second non-volatile memory space 206 to look-up the appropriate GPP power settings for the new lowered accelerator power budget and then applies 10 them to the GPP 202. With the new power settings being applied to the GPP 202, the GPP's power consumption will come down so that the overall accelerator's power consumption falls within the new lower power budget.

Continuing with the example, assume the host has determined it no longer needs to conserve power and places the accelerator back in its original, boot-up power budget. In this case, the process of FIGS. 2g and 2h are repeated, but the access 9 to the correlation information results in the original, higher power settings being applied 10 the GPP 202.

Assume that the SPC configuration is changed, next. Here, e.g., a management entity in the data center that the accelerator operates within determines that the accelerator is better utilized performing a different kind of acceleration and, referring to FIG. 2i, communicates 11 to the controller 203 that the SPC's configuration is to be switched to a different type of acceleration. Notably, the different SPC configuration can result in a different SPC power consumption and corresponding power allocation for the GPP.

Figure 2I:
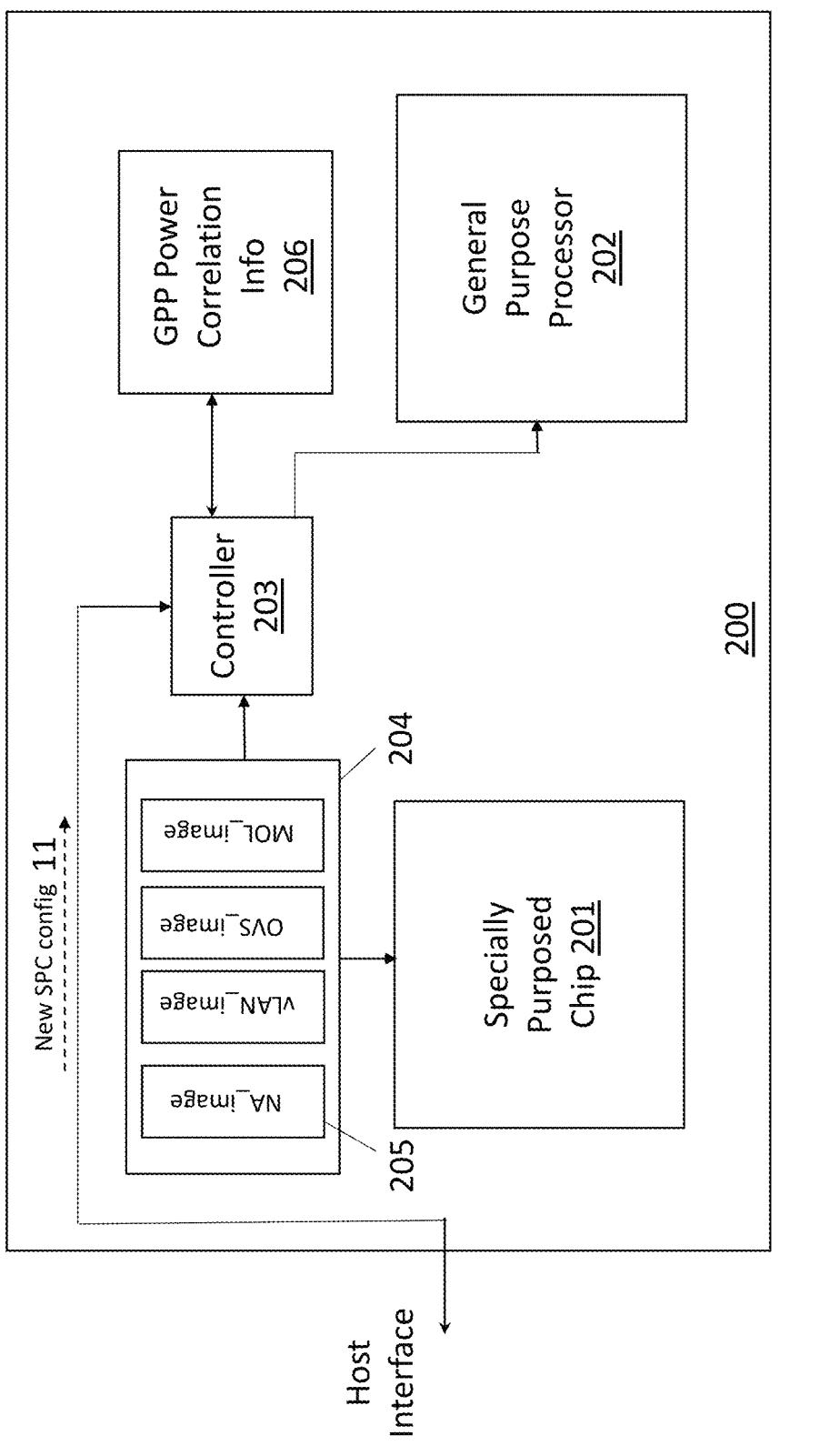
Figure 2J:
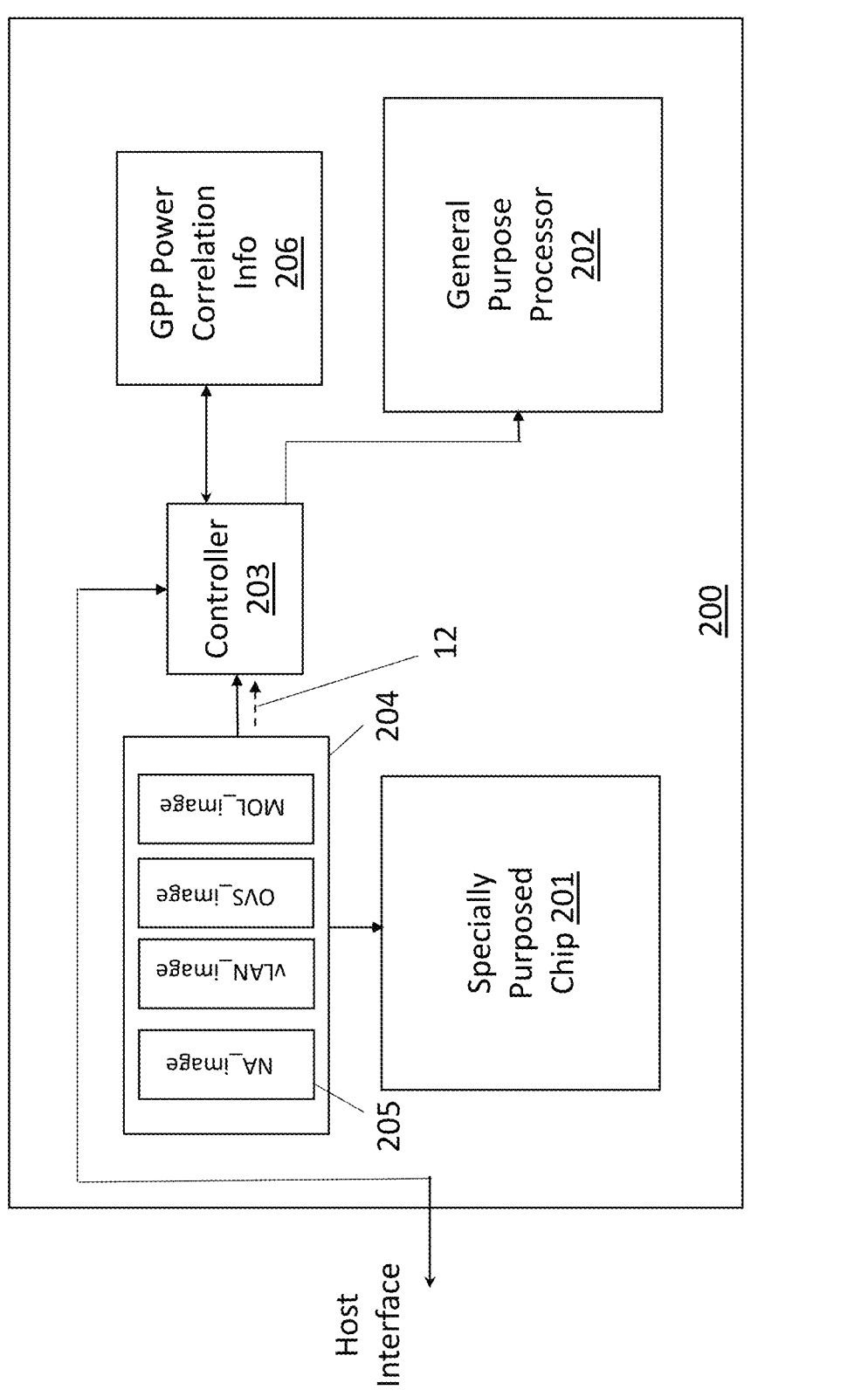
Figure 2K:
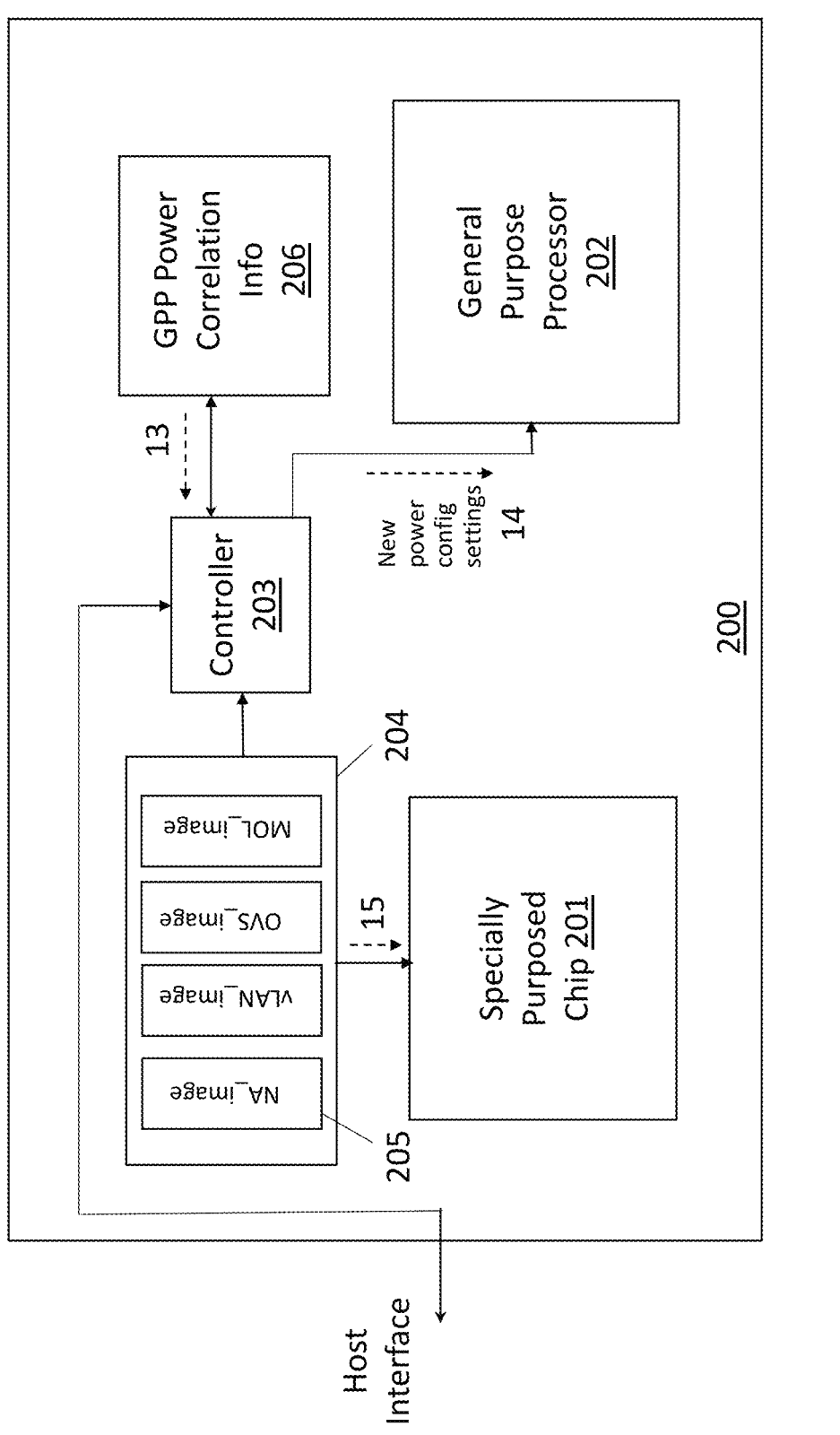

As such, referring to FIG. 2j, the controller 203 reads 12 the image for the new acceleration type from the first non-volatile memory space 205 and processes it to understand the power consumption of the SPC when in the new configuration. The controller 203 further subtracts this power consumption from the power budget to determine the GPP's new power allocation. Referring to FIG. 2k, the controller 203 next accesses 13 the correlation information in the second non-volatile memory space 206 to determine a new set of GPP power settings and applies 14 them to the GPP 202. If the SPC 201 is an FPGA, the controller 203 also causes the bitstream for the new FPGA configuration to be loaded 15 into the FPGA and causes other control signals described in the recently read image to be applied to the FPGA/SPC.

The controller 203, as part of effecting the new SPC configuration, can swap first application software that supported the prior SPC configuration out of the GPP's executable/local memory and/or swap second application software that supports the new SPC configuration into the GPP's executable/local memory, and, otherwise park the first software and start the second software. Importantly, such changes to the active application software can be made without rebooting the GPP (GPPs commonly start and quit application software programs without needing a reboot).

In further embodiments, the SPC can perform a particular type of acceleration according to different performance and power consumption tradeoffs. For example, the SPC can perform vLAN acceleration according to three different performance/power states: 1) a highest performance and power consumption state; 2) a lowest performance and power consumption state; and, 3) a middle performance and power consumption state in which the SPC's power consumption is between its respective power consumptions in states 1) and 3). The different states can be effected, e.g., by applying different clock frequencies to the SPC and/or enabling/disabling functional blocks within the SPC.

To support such granularized SPC performance/power, the image for the particular type of acceleration contains information describing the different performance/power states, their respective power consumptions and the appropriate control settings to be applied to the SPC to effect each of them. Here, any change in SPC performance/power can affect the GPP's power allocation. As such, if a change in SPC performance/power state is communicated to the accelerator (not a change in SPC acceleration), the processes of FIGS. 2i, 2j, and 2k are performed. However, if the SPC is an FPGA, in various embodiments, the FPGA's bitstream might not change because the SPC is performing the same type of acceleration before and after the change (depends on the specific FPGA design).

Importantly, according to the examples described above, note that the GPP was never rebooted after the initial accelerator despite all the changes that were made to its power settings and active application software.

Figure 3:
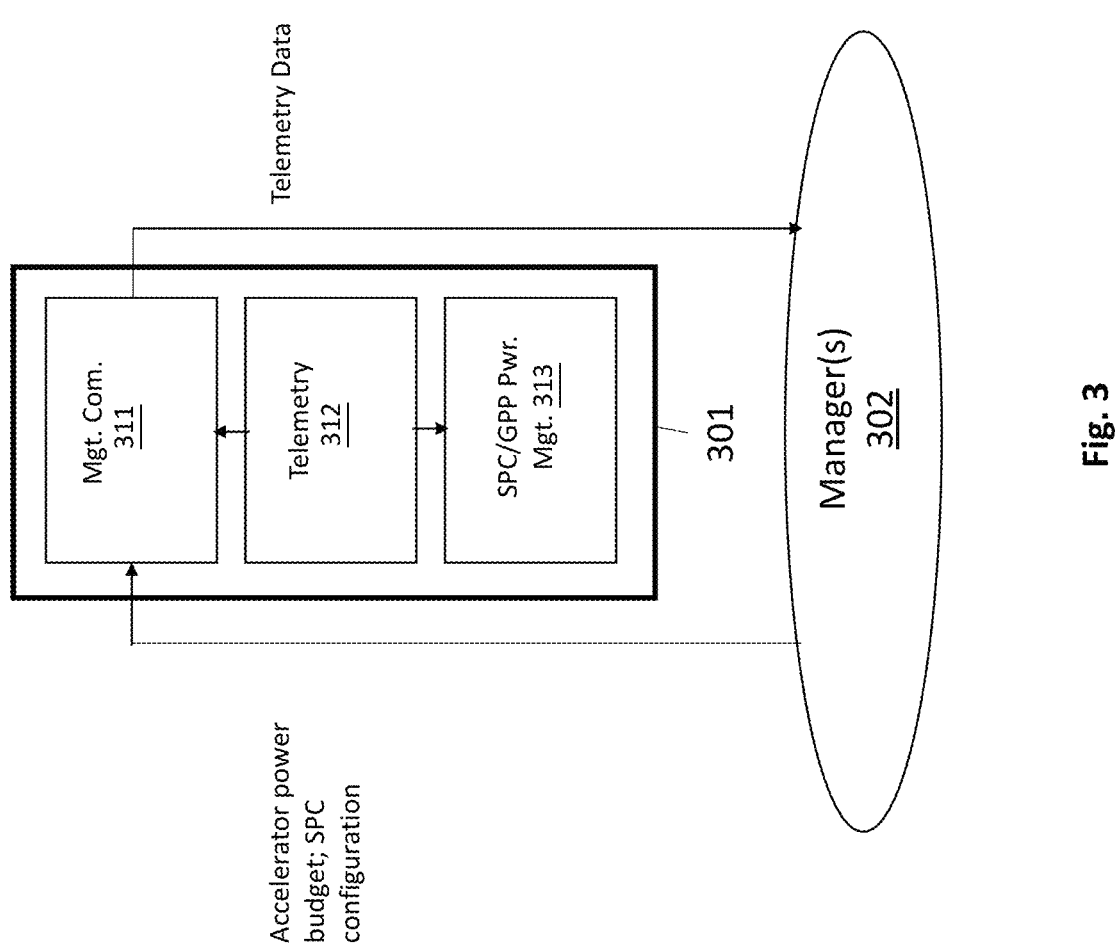
FIG. 3 depicts an embodiment of software that can execute on a controller of the accelerator.

FIG. 3 shows an architecture for the program code 301 that is executed by the accelerator's controller within, e.g., a data center environment. As observed in FIG. 3, the software includes three different functional layers: 1) a management control layer 311 that communicates with one or more management entities 302 that control the accelerator's power consumption and/or acceleration configurations; 2) a telemetry layer 312 that accumulates power consumption data of the acceleration in real time and reports such information and/or raises flags in view of such information; and, 3) an SPC/GPP power management layer that processes the SPC images, determines the correlation information, determines GPP power allocation and the GPP power settings, and/or applies new configurations to the SPC as described above at length.

Here, the management entities 302 can be, e.g., one or more computer system power and/or service control functions executing as software on CPU resources of a computer that the accelerator is plugged into, and/or, one or more data center power and/or service control functions executing as software on CPU resources of one or more computers within a data center that includes the computer that the accelerator is plugged into, etc.

Here, for example, if a server computer that the accelerator is integrated into determines that it is consuming too little/much power it can raise/lower the accelerator's power budget in response (and/or the SPC's performance/power tradeoff). Likewise, if the server computer has committed to certain service performance levels which include or rely on acceleration, the server computer can reconfigure the type of acceleration being performed on the accelerator. These same functions can be performed by some entity that is external from the server (e.g., a data center control function) in combination with or instead of the server.

The management communication layer 311 of the controller's software receives the acceleration power budget and/or SPC configuration commands from any/all of the management entit(ies) 302 during boot-up, during runtime, or both.

The accelerator, in various embodiments, also includes a telemetry layer 312 to monitor its performance and power consumption, e.g., collectively and/or by the SPC and/or GPP individually. The monitoring results are reported to the communication layer 311 which reports them out the management entit(ies) 302. In cases of mis-operation, such as the accelerator is consuming power beyond its power budget, the telemetry layer 312 can send warning flags to the SPC/GPP management layer 313 and/or the management entit(ies) 302. Even further, the telemetry layer 312 or other function of the controller 203 can request the management entit(ies) 302 to re-balance the current power allocations (e.g., so that the accelerator receives more power, e.g., at the expense of other accelerators, servers or other components whose power consumption is managed by the entit(ies) 302).

Note that the controller 203 can also execute additional power management intelligence that allows the controller 203 to invoke changes to SPC configuration and/or GPP power allocation based on its own decision rather than in response to an external command. For example, if through the telemetry layer 312 the controller recognizes that the accelerator 200 is being underutilized, the controller can reduce the GPP power allocation and/or drop the SPC to a lower performance and power consumption state. Likewise if the controller 203 (e.g., through the telemetry layer 312) recognizes that the accelerator 200 is being over-utilized the controller 203 can rise the SPC and/or GPP to a higher performance and power consumption state.

Figure 4:
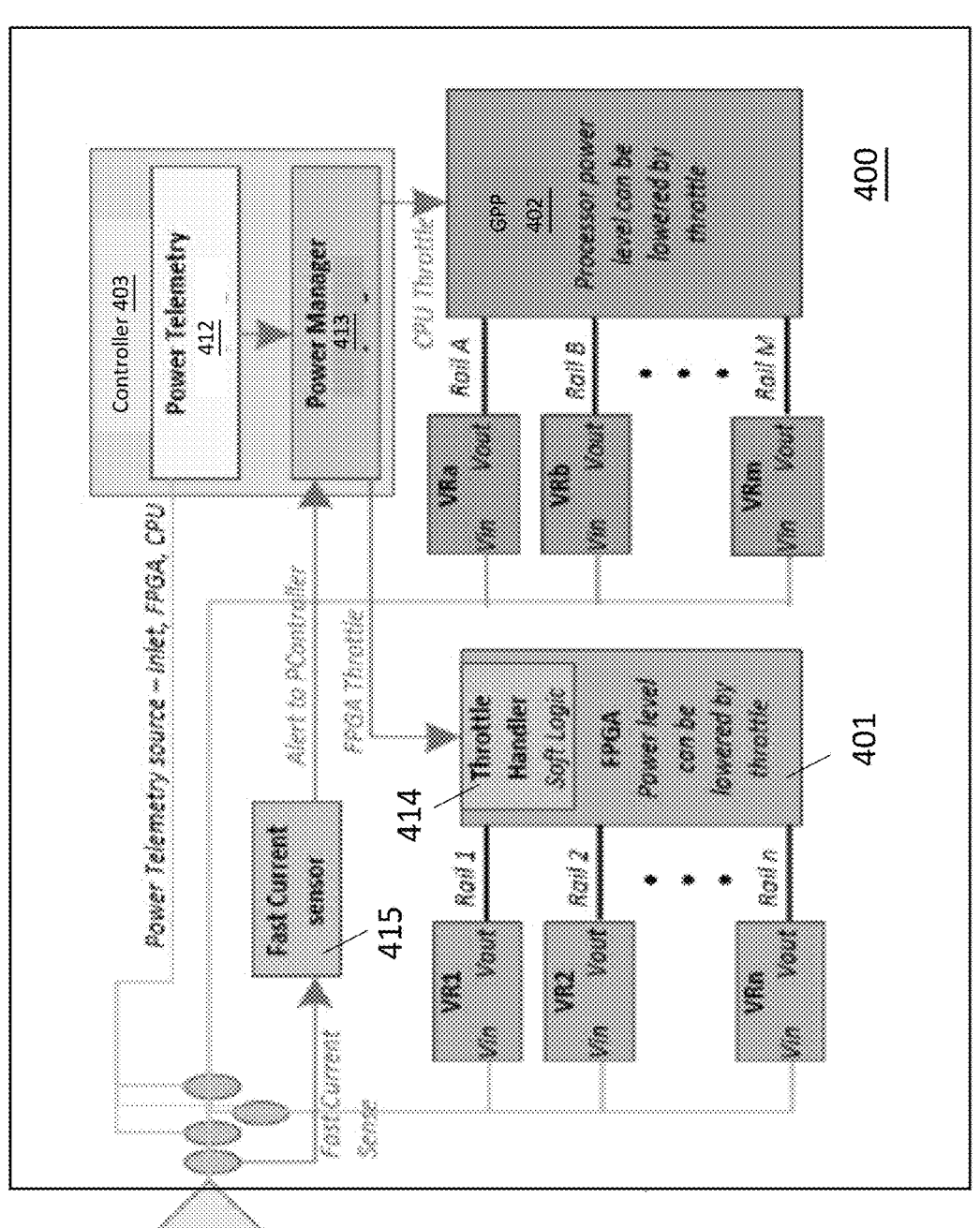
FIG. 4 shows another embodiment of an accelerator.

Moreover, referring to FIG. 4, certain ones of the aforementioned software layers 311, 312, 313 can be converted into logic circuits that are embedded into the controller 203 as hardware blocks (rather than executing software). FIG. 4 depicts an exemplary accelerator 400 in which the aforementioned telemetry 312 and SPC/GPP management layers 313 are implemented as hardware blocks 412, 413 within the controller 403 rather than as executing software. The integration of the hardware blocks 412, 413 generally improves the response times and propagation delays of the controller 403 with respect to the execution of the telemetry and SPC/GPP power management functions.

Additionally, the SPC 401 (FPGA in the exemplary accelerator of FIG. 4) includes power throttling logic 414 so that it can rapidly respond to any changes made to its performance and power consumption state as applied by the SPC/GPP hardware logic block 413. Moreover, the accelerator 400 includes a fast current sense circuit 415 that can rapidly detect sudden changes in power current draw by the accelerator 400 (e.g., a fast analog to digital converter (ADC)). As observed in FIG. 4, the output of the current sense circuit 415 is coupled to the telemetry hardware block 413. An output of the telemetry hardware block 412 is coupled to the SPC/GPP power management hardware block 413. An output of the SPC/GPP power management block 413, in turn, is coupled the SPC's power throttling logic 414.

As such, an end-to-end hardware path exists from the moment the accelerator begins to draw excess current (as detected by the current sense circuit 415 and realized by the telemetry block 412) to the moment the performance and power state of the SPC 401 is throttle down (as applied by the SPC/GPP power management block 413 and implemented by the throttling logic 414). With the end-to-end hardware path, the accelerator 400 can rapidly reduce SPC (and overall accelerator 400) power consumption in response to the accelerator 400 drawing too much power supply current (which corresponds to too much accelerator power consumption).

The GPP 402 also typically includes an internal hardware power management block, thus rapid (end-to-end) throttling down of the GPP 402 can also be concurrently performed by the SPC/GPP management block 413 according to the same excess current sense and telemetry flag that causes an SPC throttle down.

Although embodiments above have stressed the controller's power decisions in terms of the GPP and SPC, in other embodiments other accelerator components, such as memory, can be considered. Also, operating conditions, such as ambient temperature. With respect to memory, typically, both the GPP and the SPC have their own local memories that they use, e.g., as a scratchpad, to write/read data to/from. The faster the local memory, the faster the GPP/SPC can operate (because the data can be written/read faster). At the same time, the faster the memory, the more power the memory consumes.

As such, in various embodiments, at least some of the performance/power states of the GPP and/or SPC are defined so as to specify a particular memory performance/power state (e.g., by configuring a particular memory clock speed). In other or combined embodiments, memory is considered to be a separate accelerator component that the accelerator's budget is to accommodate and whose power/performance is separately managed than the GPP and/or SPC.

In still other or combined embodiments, the controller can modulate GPP/SPC (and/or memory) performance/power state based on ambient temperature (and/or die temperatures of the GPP/SPC/memory) such that performance/power is lowered as temperature increases and/or performance/power is raised as temperature decreases. In further alternative or combined embodiments, the controller can modulate the performance/power state of its "input/output (I/O)" interface(s). Here, for example, if the accelerator is coupled to the host through a PCIe or CXL interface, the controller modulates the speed and corresponding power consumption (higher speed correlates to higher power consumption) based on available power in the accelerator's power budget.

Any/all of the above described accelerator embodiments can be implemented as an adaptor card (e.g., a Peripheral Connect Interconnect express (PCIe) adaptor card) that plugs into a larger system (e.g. a server). In other implementations the accelerator takes on a different form factor that a PCIe card, such as a riser card, Open Compute Project Accelerator Module (OAM) having a Compute Express Link (CXL) interface at the module interface, or, some other form factor module that plugs into a larger (e.g., host) electronic system.

The precise mechanism used to communicate from a larger, host system to the accelerator can take on any of various forms including a single mechanism or multiple mechanisms for a particular accelerator. Such mechanisms can be "in-band" in which the communication takes place through a primary data path or interface between the accelerator and the host system it plugs into (e.g., a PCIe interface if the accelerator is a PCIe card), and/or, "out-of-band" in which the communication takes place through some other communication path that exists between the host and the accelerator (e.g., a proprietary interface, an I3C bus, an SMBus, a Management Component Transport Protocol (MCTP) over SMBus communication, etc.).

The controller can be implemented with dedicated electronic circuitry, electronic circuitry that executes program code or some combination of these so that the controller can perform its functions in hardware, in software or by a combination of hardware and software. The first and second non-volatile storage space can be implemented with one or more non-volatile memory chips disposed on the accelerator. Each of the SPC, GPP, and controller can each be implemented as a packaged integrated circuit chip ("integrated circuit").

Figure 5:
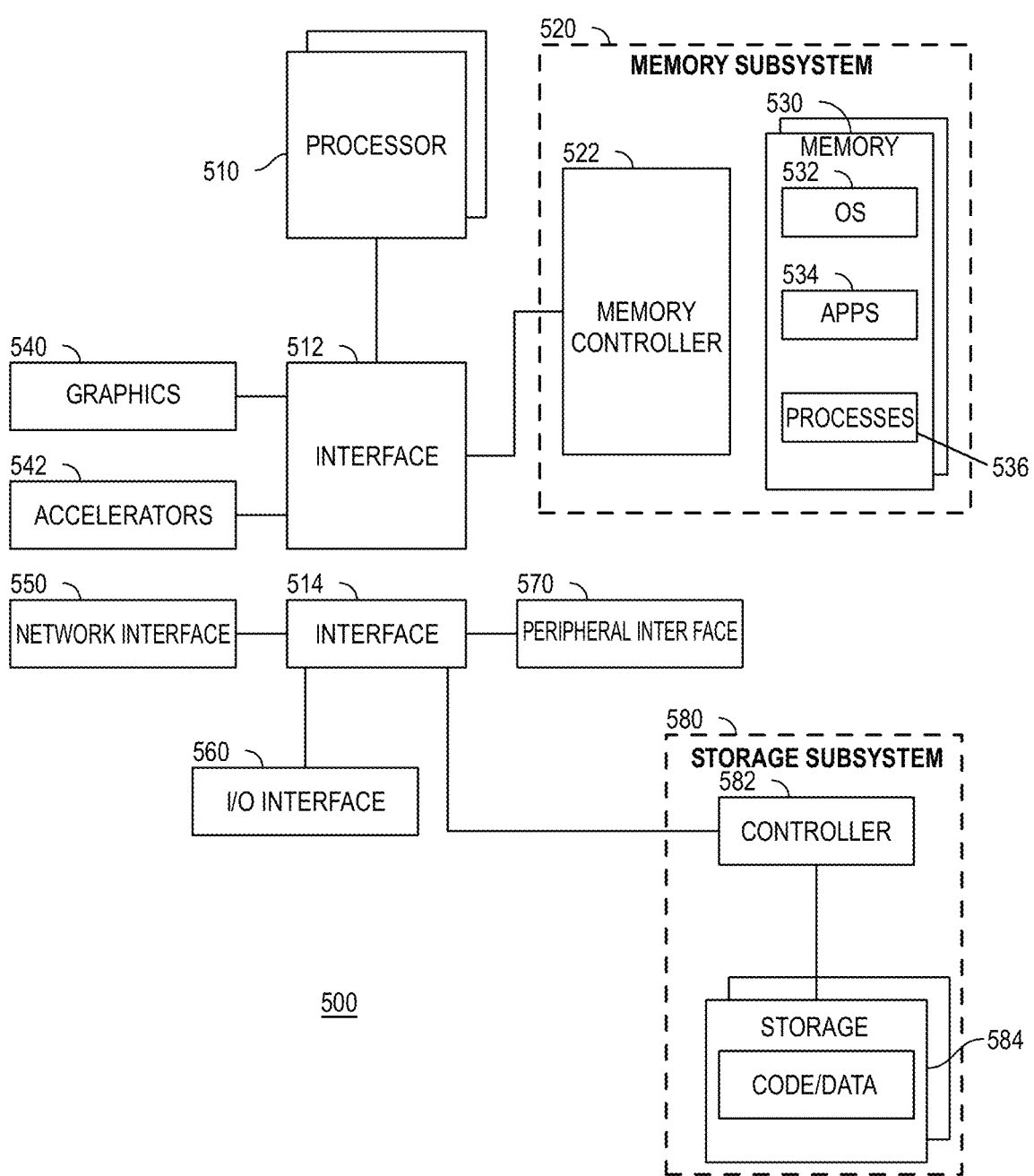
FIG. 5 shows an electronic system.
Figure 6:
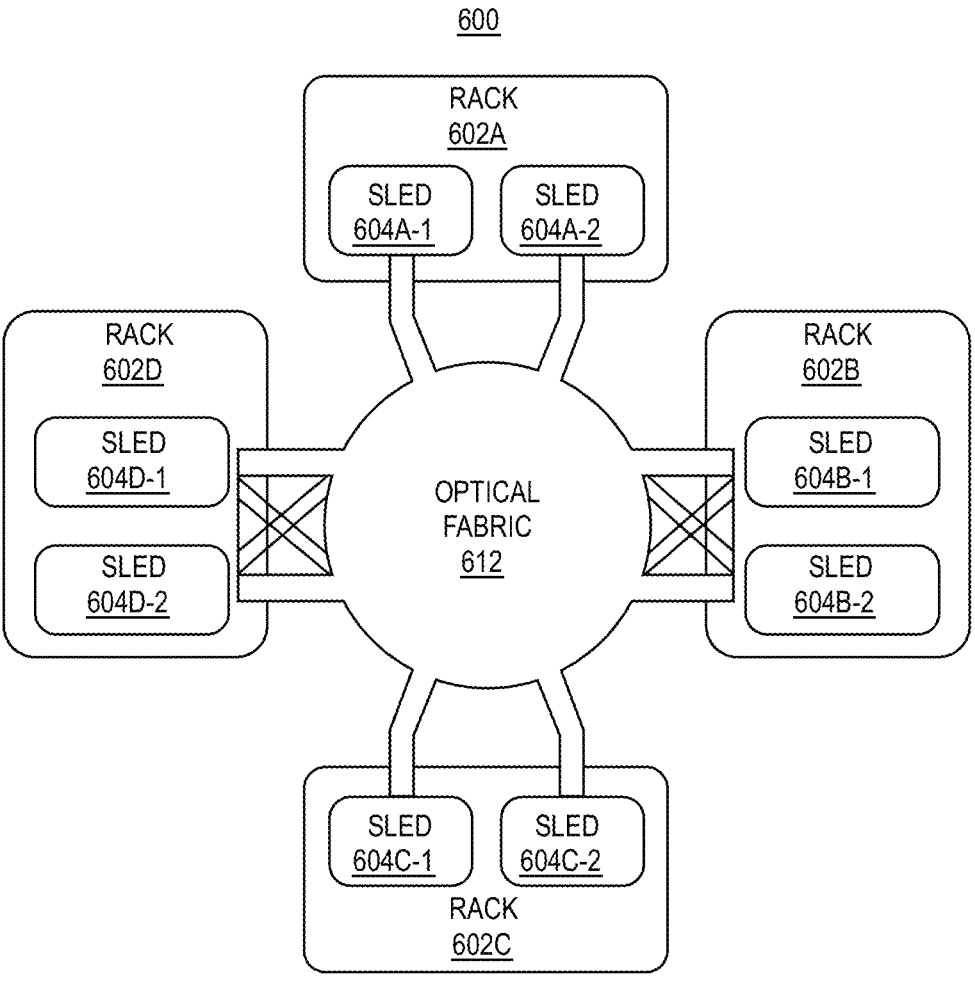
FIG. 6 shows a data center.
Figure 7:
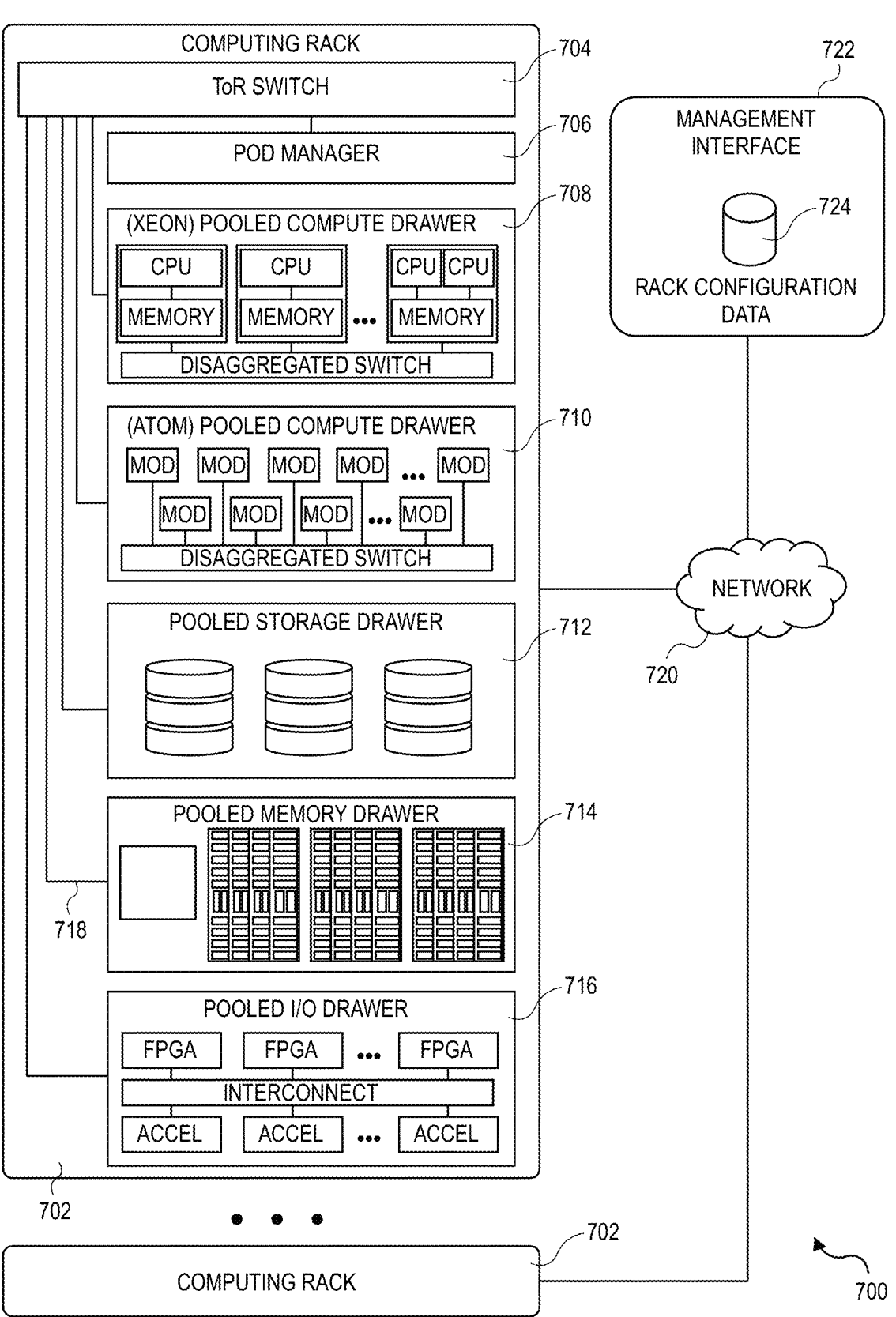
FIG. 7 shows a rack.

The following discussion concerning FIGS. 5, 6, and 7 are directed to systems, data centers and rack implementations, generally. FIG. 5 generally describes possible features of an electronic system (e.g., computer) that an accelerator as described above can be integrated (e.g., plugged) into. FIG. 6 describes possible features of a data center that can include such electronic systems. FIG. 7 describes possible features of a rack having one or more such electronic systems installed into it.

FIG. 5 depicts an example system. System 500 includes processor 510, which provides processing, operation management, and execution of instructions for system 500. Processor 510 can include any type of microprocessor, central processing unit (CPU), graphics processing unit (GPU), processing core, or other processing hardware to provide processing for system 500, or a combination of processors. Processor 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Certain systems also perform networking functions (e.g., packet header processing functions such as, to name a few, next nodal hop lookup, priority/flow lookup with corresponding queue entry, etc.), as a side function, or, as a point of emphasis (e.g., a networking switch or router). Such systems can include one or more network processors to perform such networking functions (e.g., in a pipelined fashion or otherwise).

In one example, system 500 includes interface 512 coupled to processor 510, which can represent a higher speed interface or a high throughput interface for system components that needs higher bandwidth connections, such as memory subsystem 520 or graphics interface components 540, or accelerators 542. Interface 512 represents an interface circuit, which can be a standalone component or integrated onto a processor die. Where present, graphics interface 540 interfaces to graphics components for providing a visual display to a user of system 500. In one example, graphics interface 540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 540 generates a display based on data stored in memory 530 or based on operations executed by processor 510 or both. In one example, graphics interface 540 generates a display based on data stored in memory 530 or based on operations executed by processor 510 or both.

Accelerators 542 can be a fixed function offload engine that can be accessed or used by a processor 510. For example, an accelerator among accelerators 542 can provide compression (DC) capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), "X" processing units (XPUs), programmable control logic circuitry, and programmable processing elements such as field programmable gate arrays (FPGAs). Accelerators 542, processor cores, or graphics processing units can be made available for use by artificial intelligence (AI) or machine learning (ML) models. For example, the AI model can use or include any or a combination of a reinforcement learning scheme, Q-learning scheme, deep-Q learning, or Asynchronous Advantage Actor-Critic (A3C), convolutional neural network, recurrent convolutional neural network, or other AI or ML model. Multiple neural networks, processor cores, or graphics processing units can be made available for use by AI or ML models.

Memory subsystem 520 represents the main memory of system 500 and provides storage for code to be executed by processor 510, or data values to be used in executing a routine. Memory subsystem 520 can include one or more memory devices 530 such as read-only memory (ROM), flash memory, volatile memory, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software functionality to provide functions for system 500. In one example, memory subsystem 520 includes memory controller 522, which is a memory controller to generate and issue commands to memory 530. It will be understood that memory controller 522 could be a physical part of processor 510 or a physical part of interface 512. For example, memory controller 522 can be an integrated memory controller, integrated onto a circuit with processor 510. In some examples, a system on chip (SOC or SoC) combines into one SoC package one or more of: processors, graphics, memory, memory controller, and Input/Output (I/O) control logic circuitry.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory), JESD235, originally published by JEDEC in October 2013, LPDDR5, HBM2 (HBM version 2), or others or combinations of memory technologies, and technologies based on derivatives or extensions of such specifications.

In various implementations, memory resources can be "pooled". For example, the memory resources of memory modules installed on multiple cards, blades, systems, etc. (e.g., that are inserted into one or more racks) are made available as additional main memory capacity to CPUs and/or servers that need and/or request it. In such implementations, the primary purpose of the cards/blades/systems is to provide such additional main memory capacity. The cards/blades/systems are reachable to the CPUs/servers that use the memory resources through some kind of network infrastructure such as CXL, CAPI, etc.

The memory resources can also be tiered (different access times are attributed to different regions of memory), disaggregated (memory is a separate (e.g., rack pluggable) unit that is accessible to separate (e.g., rack pluggable) CPU units), and/or remote (e.g., memory is accessible over a network).

While not specifically illustrated, it will be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect express (PCIe) bus, a HyperTransport or industry standard architecture (ISA) bus, a small computer system interface (SCSI) bus, Remote Direct Memory Access (RDMA), Internet Small Computer Systems Interface (iSCSI), NVM express (NVMe), Coherent Accelerator Interface (CXL), Coherent Accelerator Processor Interface (CAPI), Cache Coherent Interconnect for Accelerators (CCIX), Open Coherent Accelerator Processor (Open CAPI) or other specification developed by the Gen-z consortium, a universal serial bus (USB), or an Institute of Electrical and Electronics Engineers (IEEE) standard 1394 bus.

In one example, system 500 includes interface 514, which can be coupled to interface 512. In one example, interface 514 represents an interface circuit, which can include standalone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a remote device, which can include sending data stored in memory. Network interface 550 can receive data from a remote device, which can include storing received data into memory. Various embodiments can be used in connection with network interface 550, processor 510, and memory subsystem 520.

In one example, system 500 includes one or more input/ output (I/O) interface(s) 560. I/O interface 560 can include one or more interface components through which a user interacts with system 500 (e.g., audio, alphanumeric, tactile/ touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data in a persistent state (e.g., the value is retained despite interruption of power to system 500). Storage 584 can be generically considered to be a "memory," although memory 530 is typically the executing or operating memory to provide instructions to processor 510. Whereas storage 584 is nonvolatile, memory 530 can include volatile memory (e.g., the value or state of the data is indeterminate if power is interrupted to system 500). In one example, storage subsystem 580 includes controller 582 to interface with storage 584. In one example controller 582 is a physical part of interface 514 or processor 510 or can include circuits in both processor 510 and interface 514.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base, and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 500. More specifically, power source typically interfaces to one or multiple power supplies in system 500 to provide power to the components of system 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 500 can be implemented as a disaggregated computing system. For example, the system 500 can be implemented with interconnected compute sleds of processors, memories, storages, network interfaces, and other components. High speed interconnects can be used such as PCIe, Ethernet, or optical interconnects (or a combination thereof). For example, the sleds can be designed according to any specifications promulgated by the Open Compute Project (OCP) or other disaggregated computing effort, which strives to modularize main architectural components into rack-pluggable components (e.g., a rack pluggable processing component, a rack pluggable memory component, a rack pluggable storage component, a rack pluggable accelerator component, etc.).

Although a computer is largely described by the above discussion of FIG. 5, other types of systems to which the above described invention can be applied and are also partially or wholly described by FIG. 5 are communication systems such as routers, switches, and base stations.

FIG. 6 depicts an example of a data center. Various embodiments can be used in or with the data center of FIG. 6. As shown in FIG. 6, data center 600 may include an optical fabric 612. Optical fabric 612 may generally include a combination of optical signaling media (such as optical cabling) and optical switching infrastructure via which any particular sled in data center 600 can send signals to (and receive signals from) the other sleds in data center 600. However, optical, wireless, and/or electrical signals can be transmitted using fabric 612. The signaling connectivity that optical fabric 612 provides to any given sled may include connectivity both to other sleds in a same rack and sleds in other racks.

Data center 600 includes four racks 602A to 602D and racks 602A to 602D house respective pairs of sleds 604A-1 and 604A-2, 604B-1 and 604B-2, 604C-1 and 604C-2, and 604D-1 and 604D-2. Thus, in this example, data center 600 includes a total of eight sleds. Optical fabric 612 can provide sled signaling connectivity with one or more of the seven other sleds. For example, via optical fabric 612, sled 604A-1 in rack 602A may possess signaling connectivity with sled 604A-2 in rack 602A, as well as the six other sleds 604B-1, 604B-2, 604C-1, 604C-2, 604D-1, and 604D-2 that are distributed among the other racks 602B, 602C, and 602D of data center 600. The embodiments are not limited to this example. For example, fabric 612 can provide optical and/or electrical signaling.

FIG. 7 depicts an environment 700 that includes multiple computing racks 702, each including a Top of Rack (ToR) switch 704, a pod manager 706, and a plurality of pooled system drawers. Generally, the pooled system drawers may include pooled compute drawers and pooled storage drawers to, e.g., effect a disaggregated computing system. Optionally, the pooled system drawers may also include pooled memory drawers and pooled Input/Output (I/O) drawers. In the illustrated embodiment the pooled system drawers include an INTEL® XEON® pooled computer drawer 708, and INTEL® ATOM™ pooled compute drawer 710, a pooled storage drawer 712, a pooled memory drawer 714, and a pooled I/O drawer 716. Each of the pooled system drawers is connected to ToR switch 704 via a high-speed link 718, such as a 40 Gigabit/second (Gb/s) or 100 Gb/s Ethernet link or an 100+Gb/s Silicon Photonics (SiPh) optical link. In one embodiment high-speed link 718 comprises an 600 Gb/s SiPh optical link.

Again, the drawers can be designed according to any specifications promulgated by the Open Compute Project (OCP) or other disaggregated computing effort, which strives to modularize main architectural computer components into rack-pluggable components (e.g., a rack plug-gable processing component, a rack pluggable memory component, a rack pluggable storage component, a rack pluggable accelerator component, etc.).

Multiple of the computing racks 700 may be interconnected via their ToR switches 704 (e.g., to a pod-level switch or data center switch), as illustrated by connections to a network 720. In some embodiments, groups of computing racks 702 are managed as separate pods via pod manager(s) 706. In one embodiment, a single pod manager is used to manage all of the racks in the pod. Alternatively, distributed pod managers may be used for pod management operations. RSD environment 700 further includes a management interface 722 that is used to manage various aspects of the RSD environment. This includes managing rack configuration, with corresponding parameters stored as rack configuration data 724.

Any of the systems, data centers or racks discussed above, apart from being integrated in a typical data center, can also be implemented in other environments such as within a bay station, or other micro-data center, e.g., at the edge of a network.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds, and other design or performance constraints, as desired for a given implementation.

Some examples may be implemented using or as an article of manufacture or at least one computer-readable medium. A computer-readable medium may include a non-transitory storage medium to store program code. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the program code implements various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled, and/or interpreted programming language.

To the extent any of the teachings above can be embodied in a semiconductor chip, a description of a circuit design of the semiconductor chip for eventual targeting toward a semiconductor manufacturing process can take the form of various formats such as a (e.g., VHDL or Verilog) register transfer level (RTL) circuit description, a gate level circuit description, a transistor level circuit description or mask description or various combinations thereof. Such circuit descriptions, sometimes referred to as "IP Cores", are commonly embodied on one or more computer readable storage media (such as one or more CD-ROMs or other type of storage technology) and provided to and/or otherwise processed by and/or for a circuit design synthesis tool and/or mask generation tool. Such circuit descriptions may also be embedded with program code to be processed by a computer that implements the circuit design synthesis tool and/or mask generation tool.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software, and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences may also be performed according to alternative embodiments. Furthermore, additional sequences may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

The invention claimed is:

1. An accelerator package apparatus, comprising:
an interface to plug into an electronic system;
a field programmable gate array integrated circuit to perform acceleration;
a general purpose processor integrated circuit to execute software related to the acceleration; and
controller circuitry to dynamically change, without rebooting the general purpose processor integrated circuit, allocation of the accelerator package's power budget to the field programmable gate array integrated circuit and the general purpose processor integrated circuit.

2. The accelerator package of claim 1 wherein the controller circuitry is to dynamically change, without rebooting the general purpose processor integrated circuit, the field programmable gate array integrated circuit's acceleration and the software executed by the general purpose processor that is related to the field programmable gate array integrated circuit's acceleration.

3. The accelerator package of claim 2 wherein the accelerator package further comprises:
a first non-volatile storage space to store different images for respective types of acceleration that the field programmable gate array integrated circuit is able to perform, the different images including power information that describes different power consumption of the field programmable gate array integrated circuit when performing the respective types of acceleration.

4. The accelerator package of claim 3 wherein the different images further comprise respective bitstreams to configure the field programmable gate array integrated circuit with respective logic to perform the respective types of acceleration.

5. The accelerator package of claim 3 wherein the controller is to determine one or more power settings for the general purpose processor integrated circuit in view of the power information and the accelerator package's power budget.

6. The accelerator package of claim 2 wherein the controller is to change the software because of the change in the field programmable gate array integrated circuit's acceleration.

7. The accelerator package of claim 2 wherein the change in acceleration is from one of the following to another, different one of the following:
network acceleration;
virtual radio access network (vRAN) acceleration;
open virtual switching (OVS) acceleration;
memory offloading acceleration; or
software function call dispatching.

8. The accelerator package of claim 1 wherein the dynamic change is in response to a command received by the accelerator package.

9. The accelerator package of claim 1 wherein the controller is further to keep the accelerator package's power consumption within a power budget that is assigned to the accelerator package.

10. The accelerator package of claim 9 wherein, in order to keep the accelerator package's power consumption within the power budget, the controller is to cause power to be provided to the field programmable gate array integrated circuit consistent with configuration specific power profile information for the field programmable gate array integrated circuit, and, provide at least a portion of remaining power in the budget to the general purpose processor integrated circuit.

11. The accelerator package of claim 1 wherein the controller is to request an external power management entity to rebalance its power allocations.

12. The accelerator package of claim 1 wherein the accelerator package further comprises:
a current detect circuit;
respective power throttling and/or power management circuits within the field programmable gate array integrated circuit and the general purpose processor integrated circuit to perform power throttling and/or power management of the field programmable gate array integrated circuit and the general purpose processor; and
telemetry and power management circuits within the controller to command the power throttling and/or power management circuits to lower the power of the field programmable gate array integrated circuit and the general purpose processor integrated circuit in response to a signal from the current detect circuit that the accelerator package has exceeded a power level.

13. A computing system, comprising:
a plurality of processors;
a memory coupled to the plurality of processors;
a peripheral controller; and
an accelerator package plugged into an interface of the computing system, the accelerator package to include:
a field programmable gate array integrated circuit to perform acceleration;
a general purpose processor integrated circuit to execute software related to the acceleration; and
controller circuitry to dynamically change, without rebooting the general purpose processor integrated circuit, allocation of the accelerator package's power budget to the field programmable gate array integrated circuit and the general purpose processor integrated circuit.

14. The computing system of claim 13 wherein the controller circuitry is to dynamically change, without rebooting the general purpose processor integrated circuit, the field programmable gate array integrated circuit's acceleration and the software executed by the general purpose processor that is related to the field programmable gate array integrated circuit's acceleration.

15. The computing system of claim 14 wherein the accelerator package further comprises:
a first non-volatile storage space to store different images for respective types of acceleration that the field programmable gate array integrated circuit is able to perform, the different images including power information that describes different power consumption of the field programmable gate array integrated circuit when performing the respective types of acceleration.

16. The computing system of claim 15 wherein the different images further comprise respective bitstreams to configure the field programmable gate array integrated circuit with respective logic to perform the respective types of acceleration.

17. The computing system of claim 15 wherein the controller is to determine one or more power settings for the general purpose processor integrated circuit in view of the power information and the accelerator package's power budget.

18. The computing system of claim 14 wherein the controller is to change the software because of a change from a first type of acceleration to a second type of acceleration.

19. The computing system of claim 18 wherein one of the first and second types of acceleration are any of the following:

network acceleration;

virtual radio access network (vRAN) acceleration;

open virtual switching (OVS) acceleration;

memory offloading acceleration; or software function call dispatching.

20. The computing system of claim 13 wherein the accelerator package is one of:

a) a Peripheral Connect Interconnect express (PCIe) adaptor card; or b) an Open Compute Project Accelerator module (OAM).

21. A data center, comprising:

racks of computers, wherein, one of the computers includes an accelerator package, the accelerator package including:

a field programmable gate array integrated circuit to perform acceleration; acceleration, a general purpose processor integrated circuit to execute software related to the acceleration; and controller circuitry to dynamically change, without rebooting the general purpose processor integrated circuit, a balance of power between the field programmable gate array integrated circuit and the general purpose processor integrated circuit;

data center power and/or service control software executing on CPU resources of one or more other computers of the data center, the data center power and/or service control software to command the accelerator package to perform the dynamic change; and a network coupled between the racks of computers and the one or more other computers.

22. The data center of claim 21 wherein the controller is to also change the software as part of the dynamic change because of a change from a first type of acceleration to a second type of acceleration.

23. The data center of claim 22 wherein one of the first and second types of acceleration are one of the following:

network acceleration;

virtual radio access network (vRAN) acceleration;

open virtual switching (OVS) acceleration;

memory offloading acceleration; or software function call dispatching.

24. The data center of claim 21 wherein the accelerator package is one of:

a) a Peripheral Connect Interconnect express (PCIe) adaptor card; or b) an Open Compute Project Accelerator module (OAM).

25. The data center of claim 21 wherein the controller circuit is to perform at least one of the following:

modulate performance and power of memory disposed on the accelerator package; or modulate performance and power of at least one of the field programmable gate array integrated circuit and the general purpose integrated circuit based on a temperature.

* * * * *